United States Patent [19]

Carroll

[11] 3,869,102
[45] Mar. 4, 1975

[54] AIRCRAFT

[75] Inventor: Charles A. Carroll, Atlanta, Ga.

[73] Assignee: International Husky, Inc., Bloomfield Hills, Mich.

[22] Filed: May 24, 1972

[21] Appl. No.: 256,394

[52] U.S. Cl.................. 244/36, 244/118 R, 244/119
[51] Int. Cl. ............................................. B64c 3/02
[58] Field of Search............ 244/36, 137 R, 119, 12, 244/118 R, 124, 120; D71/1 F

[56] References Cited
UNITED STATES PATENTS

| | | | |
|---|---|---|---|
| 2,268,009 | 12/1941 | Babb et al............................ | 244/118 |
| 2,294,367 | 9/1942 | Fleming............................... | 244/36 |
| 2,323,279 | 6/1943 | Van Zelm........................ | 244/137 R |
| 2,380,289 | 7/1945 | Burnelli .............................. | 244/124 |
| 2,380,290 | 7/1945 | Burnelli............................ | 244/118 R |
| 2,402,283 | 6/1946 | Hewitt ................................ | 244/118 |
| 2,496,087 | 1/1950 | Fleming.............................. | 244/124 |
| 2,616,639 | 11/1952 | Burnelli........................... | 244/118 R |
| 2,734,701 | 2/1956 | Horton................................. | 244/36 |
| 3,150,849 | 9/1964 | Conway et al. ................. | 244/137 R |
| 3,216,673 | 11/1965 | Alter et al....................... | 244/137 R |
| 3,630,471 | 12/1971 | Fredricks............................. | 244/36 |
| D198,610 | 7/1964 | Burnelli ............................. | D71/1 F |

Primary Examiner—Trygve M. Blix
Assistant Examiner—Galen L. Barefoot
Attorney, Agent, or Firm—Reising, Ethington & Perry

[57] ABSTRACT

A cargo aircraft. A non-pressurized hull, which can comprise a number of substantially identical hull modules, defines a rectangular cargo area. The hull has an outer skin portion which, in its vertical, longitudinal section, conforms to an air foil shape. This air foil configuration generates substantially all the lift necessary to offset the combined weights of the hull and a reasonable load. The hull supports wings, engines and a pressurized cabin for an operating crew and other elements necessary for operating the aircraft.

6 Claims, 5 Drawing Figures

AIRCRAFT

BACKGROUND OF THE INVENTION

This invention generally relates to aircraft and more specifically to novel cargo aircraft.

Generally, cargo aircraft are converted large passenger aircraft. These aircraft are usually jet powered and jet engines must operate at high altitudes to operate efficiently. At normal operating altitudes, passenger and crew areas in the aircraft must be pressurized. This requires that the aircraft have a relatively strong fuselage or hull. Although there are several ways to obtain the necessary strength, conventional aircraft use a "stressed skin" design. A "stressed skin" fuselage has the advantage of providing maximum strength with minimum weight by relying on the strength of an outer, generally circular skin and reinforcing bulkheads.

With this inherent, circular cross-section, present cargo aircraft store cargo very inefficiently. Their holds do not conform to standard or "square-cornered" containers. There are two alternatives. One alternative is to repack cargo in containers specially constructed for aircraft, but this requires expensive handling. A more normally used alternative is to lengthen or "stretch" the fuselage or hull. "Stretching" is expensive because the addition of a fuselage extension just aft of the wings may change various aerodynamic characteristics. It is then necessary to compensate for these changes.

Furthermore, stretching introduces another problem. During takeoff, an aircraft rotates on its landing gear to incline the wings to an attitude for maximum lift. This angle is relatively constant for most aircraft. As the aircraft becomes longer, the distance between the landing gear and the tail becomes greater. Therefore, the landing gear must support the aircraft underbelly higher off the ground to obtain the proper angle during takeoff. Otherwise, the tail assembly would hit the runway during takeoff. Since the landing gear is fixed while conventional aircraft is on the ground, special loading equipment is required to transfer the cargo between the high aircraft floor and trucks or loading docks with lower platforms. The alternate solution is building special loading docks, but these would have to be limited for use with a particular aircraft as different types of conventional aircraft have cargo floors at different heights above ground. Customized loading docks would be very expensive and unduly restrict the use of aircraft to airports where such special facilities were available.

Conventional cargo aircraft customarily have a single access door for unloading and loading aircraft. Usually, the containers are loaded in a single line or, in some instances, two lines. As a result, the time required to load or unload the aircraft is increased, thereby reducing the productive flying time for the aircraft. Furthermore, the arrangement of loading containers in a line means certain containers are a long way from the access door. If cargo is not located carefully during the loading operation, it is necessary to unload many intermediate containers if a single container to be delivered at a particular airport is located near the far end of the line.

Another major disadvantage of conventional cargo aircraft is a cargo weight (or payload) limitation imposed by a "zero fuel weight limit." This structural safety limitation establishes the maximum allowable weight of the aircraft and payload without any fuel on board. Conventional aircraft have this limit because the fuselage and its contents constitute a concentrated load at mid-wing. During flight, this load produces high stresses and bending moments in the wings and supporting structure, especially in turbulent air. Fuel does not increase these stresses or bending moments because fuel tanks and the fuel itself constitute a distributed load on the wings.

By way of example, consider an aircraft capable of lifting 800,000 pounds. An exemplary zero fuel weight limit is 650,000 pounds. If the aircraft itself weighs 325,000 pounds, the maximum payload is 325,000 pounds. If a flight requires the aircraft to carry 150,000 pounds of fuel, the aircraft is at its maximum gross weight and the zero fuel weight limit imposes no payload restrictions. If, on the other hand, a given flight requires only 50,000 pounds of fuel, the remaining 100,000 pounds of lifting capacity cannot be converted into any payload increase. Even though the aircraft with reduced fuel load weighs only 700,000 pounds, the zero fuel weight limit restricts the payload to the 325,000 pound maximum.

There have been special cargo aircraft proposed. In one, a fuselage carries an external special container under its belly. In addition to an unacceptable degree of aerodynamic drag and weather exposure for the cargo, these aircraft have limited cargo capacity and have not gained any reasonable commercial acceptance.

Another special cargo aircraft is a "lifting body" aircraft. When "lifting body" aircraft were used, they were powered by internal combustion engines and operated at relatively low altitudes. At these altitudes, no pressurization was necessary even in the crew quarters. Today, it is necessary to power aircraft with jet engines and operate the aircraft at high altitudes to obtain acceptable operating economies. Even if these older "lifting body" aircraft could be retrofitted with jet engines, their design makes it impractical to pressurize the hull or any part thereof to permit them to operate at more efficient higher altitudes. Therefore, "lifting body" aircraft have not gained any reasonable commercial acceptance.

As a result, converted passenger aircraft are still commonly used for hauling cargo. The above and further enumerated disadvantages of these aircraft are accepted by the industry primarily because no better alternative is available.

Therefore, it is an object of this invention to provide an aircraft which can transport cargo efficiently.

Another object of this invention is to provide an aircraft in which payload as a percentage of aircraft weight is maximized.

Still another object of this invention is to provide an aircraft which minimizes loading and unloading times.

Still another object of this invention is to provide an aircraft manufactured from modules for a variety of cargo carrying capacities.

Still another object of this invention is to provide an aircraft which facilitates the loading and unloading of cargo with trucks and standard docking platforms.

SUMMARY

In accordance with this invention, an aircraft contains a non-pressurized hull which is substantially rectangular in cross section (i.e., transverse to the roll axis) and which has cargo space extending substantially throughout its length and width. An outer skin mounted to a frame provides an airfoil shape through the entire hull. The hull also contains pressurized crew and personnel quarters. As a result, the hull generates enough lift to offset a substantial portion of its weight and its maximum cargo load. The hull may comprise a number of hull modules. If a number of hull modules are joined together in a side-by-side relationship, the cargo area and loading access increase with each hull module producing offsetting lift. Hence, redesign problems, present in prior aircraft, are substantially reduced or eliminated.

This invention is pointed out with particularity in the appended claims. A more thorough understanding of the above and further objects and advantages of this invention may be attained by referring to the following detailed description taken in conjunction with the accompanying drawings.

DESCRIPTION OF AN ILLUSTRATIVE EMBODIMENT

Figure 1:
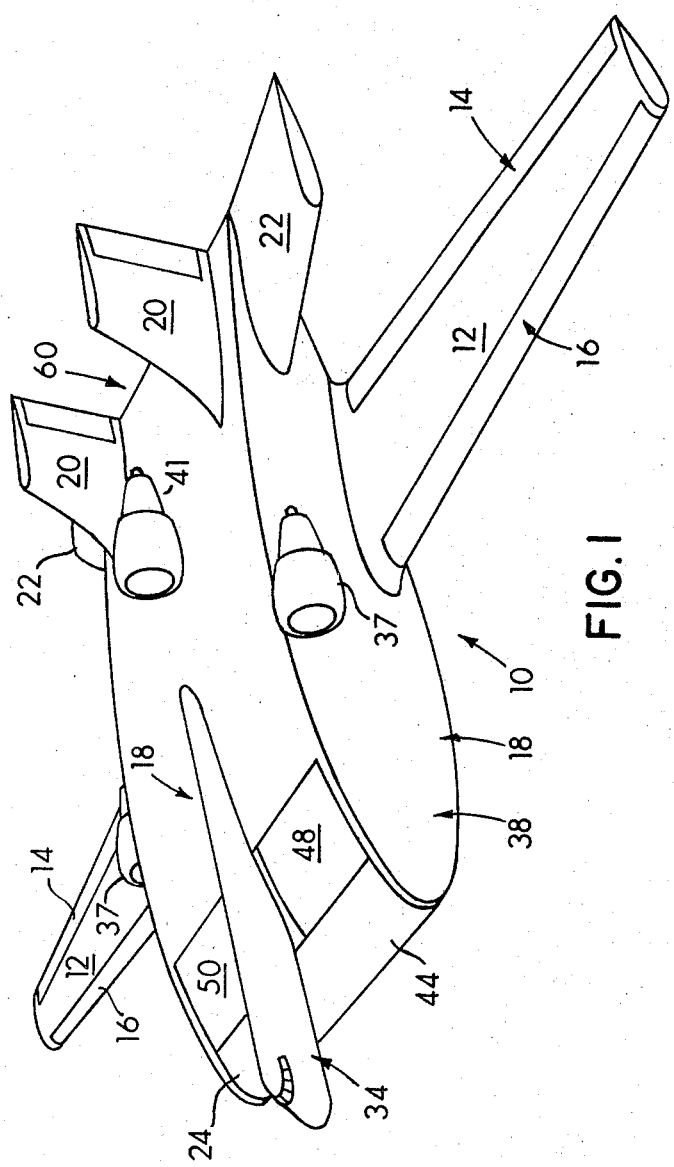
FIG. 1 is a perspective view of a specific embodiment of a cargo aircraft constructed in accordance with this invention.
Figure 2:
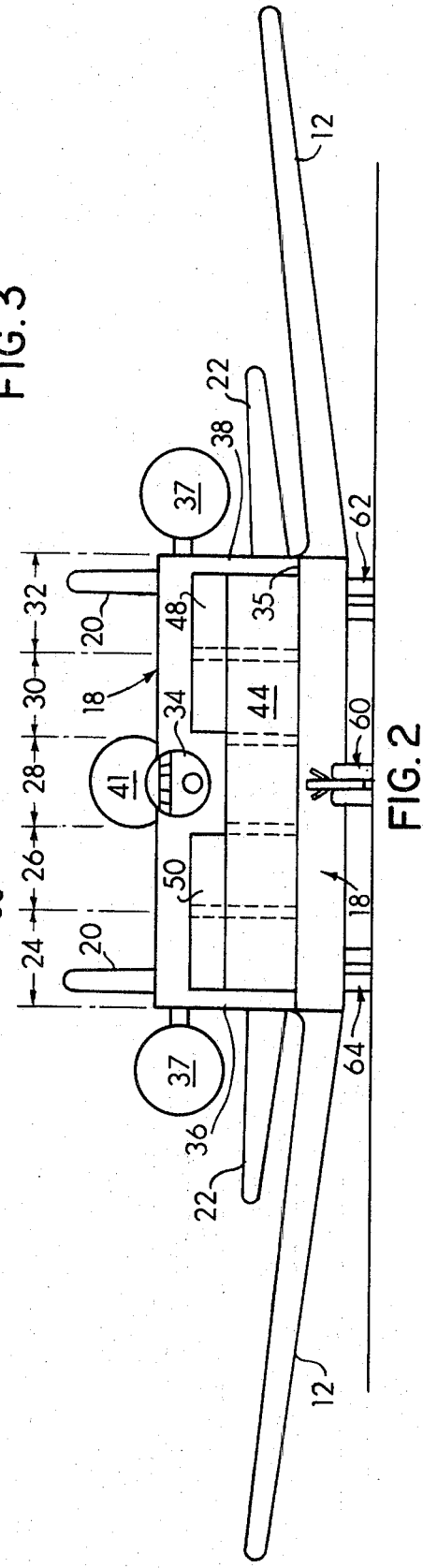
FIG. 2 is a front view of the aircraft in FIG. 1.

Referring to FIGS. 1 and 2, a cargo aircraft 10 embodying this invention comprises wings 12 which support controls 14 and 16 for controlling certain aerodynamic characteristics of the aircraft 10. The wings 12 are conventional and provide enough aerodynamic lift for supplementing the lift of a cargo hull 18. Vertical tails 20 and horizontal tails 22 perform conventional stabilizing and control functions.

The wings 12 connect to and extend from the hull 18 in a conventional manner. In this specific embodiment, the aircraft comprises five hull modules: 24, 26, 28, 30 and 32 (FIG. 2). As becomes more apparent in the following discussion, the hull 18 may comprise any number of hull modules. The modules 24, 26, 30 and 32 are identical cargo-carrying units, referred to as cargo hull modules; the module 28, on the other hand, is an example of a control hull module which supports a conventional pressurized fuselage 34. The control hull module 28 is necessary in any aircraft regardless of its capacity.

As apparent from FIGS. 1 and 2, the hull 18 does not present a concentrated loaded at mid-wing; it distributes the load along a pitch axis through the wings. This characteristic and the fact that a large portion of total lift is provided by the hull 18 (as described later) materially reduce the bending moments and stresses at the hull-wing juncture so the aircraft zero fuel weight limit can be substantially increased as a percentage of the total lift the aircraft is capable of providing. This means that direct trade-offs between fuel weight and payload can be made in the aircraft and, in particular, the lower fuel weights on shorter trips can be converted in larger payloads.

Still referring to FIGS. 2 through 5, a typical hull module contains a frame (not shown) which is rectangular in a section taken normal to the roll axis and which circumscribes a rectangular cargo space. The frame may support a cargo floor 35 extending substantially throughout the length and width of each hull module. Any number of known frame arrangements and assembly methods may be used.

Referring to FIGS. 1 and 2, jet engines 37 are mounted to the outboard hull modules 24 and 32 by way of exterior side panels 36 and 38. These outboard modules may also support the vertical and horizontal tails 20 and 22. Top and bottom hull coverings 40 and 42 are affixed to the hull modules. The center module may also support a centrally disposed jet engine 41. As the entire hull is not pressurized, a relatively light frame assembly can support the exterior aircraft covering without materially affecting the strength of the aircraft. The added structure which would be required in prior aircraft to pressurize a cargo area with a rectangular cross-section is not necessary. Furthermore, the hull does not rely on a circular stressed skin design, so many inherent disadvantages of that design are eliminated.

Furthermore, the aircraft may be constructed in several ways. As previously described, any number of modules may be combined to form the hull 18. Five modules are shown in FIG. 1. However, it is also possible to build the hull 18 as an integral unit. With proper support structure, the aircraft could have an unobstructed hold, again because the aircraft needs no structure to enable pressurization.

Figure 4:
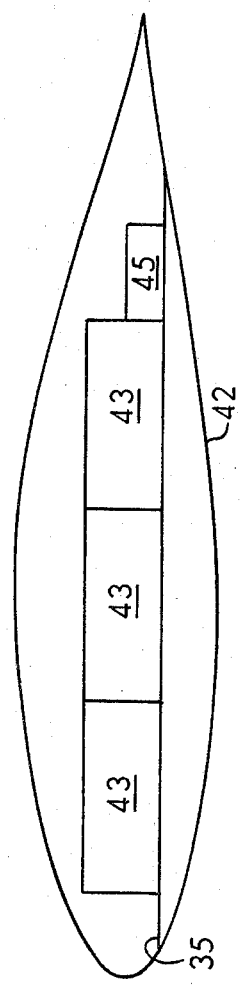
FIG. 4 is a view of a cargo area in a control module in the aircraft of FIG. 1.
Figure 3:
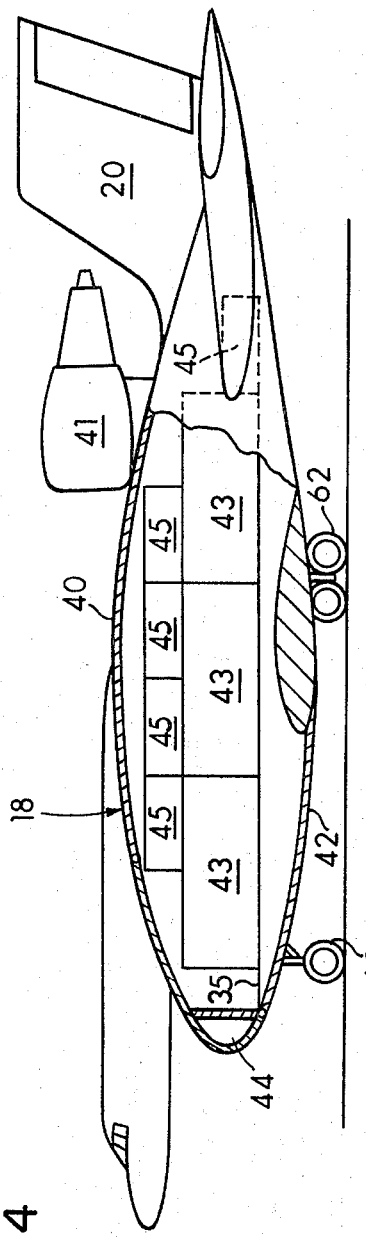
FIG. 3 is a side view partially broken away of the aircraft in FIG. 1.

As shown more clearly in FIGS. 2 and 3, the frame supports the coverings 40 and 42 so that they conform to the configuration of a hypothetical airfoil circumscribing the holds in the hull modules 24, 26, 28, 30 and 32. A cargo hull module can be constructed with any reasonable dimensions. The specific aircraft in the FIGURES is one example in which representative containers shown in each hull module are standard. That is, containers 43 are generally 20 feet long, 8 feet high and 8 feet across while containers 45 are 4 feet high, 10 feet long and 8 feet across. These are standard container dimensions and smaller containers, of course, can be combined. As an example each cargo hull module can carry three containers 43 and five containers 45 with four of the later containers being stacked on containers 43. Similarly, as shown in FIG. 4, the control hull module 28 carries three containers 43 and one container 45 or some equivalent. As described later, this reduction of cargo in the central module is necessary to support the fuselage 34.

The resulting load distribution in the hold places the center of gravity of the aircraft just above the wings. As will be apparent, assuming an even load distribution, adding or removing even numbers of hull modules from the aircraft does not move the aircraft center of gravity. As the aircraft carries standard containers, very efficient loading occurs. Hence, prior packing or repacking operations and requirements for customized containers are eliminated in this aircraft.

Wind tunnel tests show that the resulting hull 18 generates significant lift which, in fact, substantially offsets the combined weights of the hull 18 and reasonable cargo loads. This aerodynamic property allows changes to be made to the capacity of the aircraft with minimum effort. Considering an aircraft with a hull 18 based on modular construction, as each hull module adds additional cargo space, it also adds a lift increment which substantially offsets the added weight of the module and the cargo it carries. Hence, this feature and the fact that altering the number of hull modules does not change the center of gravity greatly simplify aircraft modifications and manufacture.

Specifically, it is not necessary to redesign or relocate the wings. Minor modifications, such as extending or shortening the wings, are accomplished easily, if necessary. If the wings were to stay constant, an aircraft with fewer hulls would have relatively greater lift capacity. This can be an asset as smaller aircraft normally will operate from airports with short runways. Furthermore, the addition of hull modules in a side-by-side relationship increases cargo capacity without increasing the aircraft length. Hence, the rotation at take-off does not require the landing gear to support the hull 18 higher off the ground. As a result, the cargo floor 35 on an expanded aircraft can still align with standard truck beds 45 or loading ramps as shown in FIG. 5.

Referring again to FIGS. 1, 2 and 4, the center hull module 28 is a control hull module. It is analogous to the other hull modules with one exception. The hull module 28 supports the conventional pressurized fuselage 34 and also, as shown in the specific embodiment, the jet engine 41. The fuselage 34 contains all the necessary equipment to maintain proper crew conditions and aircraft control and instrumentation with appropriate connections for the operation of the aircraft. In addition, it could provide a passenger area or a pressurized cargo area if such pressurization were required. The addition of this fuselage enables the aircraft to fly at high altitudes where jet powered aircraft operate efficiently. The addition of the fuselage and supporting structure may reduce the cargo capacity for this hull module somewhat. As apparent from a comparison of FIGS. 3 and 4, the four upper containers 45 (FIG. 3) may be eliminated by the addition of the fuselage.

As the fuselage 34 is in an upper portion of the control hull module 28, it does not interfere with cargo transfers to or from the control hull module 28 or any of the cargo hull modules. The hull 18 is shown with a common door 44 which spans the entire hull. This door, shown in its flight position in FIGS. 1 and 3 and in its lower position in FIG. 5, forms an extension of the cargo floor 35 in each hull portion. Alternatively, a segmented door arrangement can be used. Upper doors 48 and 50 astride the fuselage 34 may span the side hull portions. For example, the upper door 48 spans hull modules 30 and 32 while door 50 spans hull modules 24 and 26. If the doors are individually hinged at their aft edges, each door can swing upwardly to facilitate loading by exposing the full cargo width and height inside the hull. With all doors open, five tractor trailers could back to the front of the aircraft shown in FIG. 1 to load or unload cargo simultaneously. Given a conventional aircraft with the same capacity, loading times with this aircraft should be less than 20 per cent of the time required to load conventional aircraft.

Figure 5:
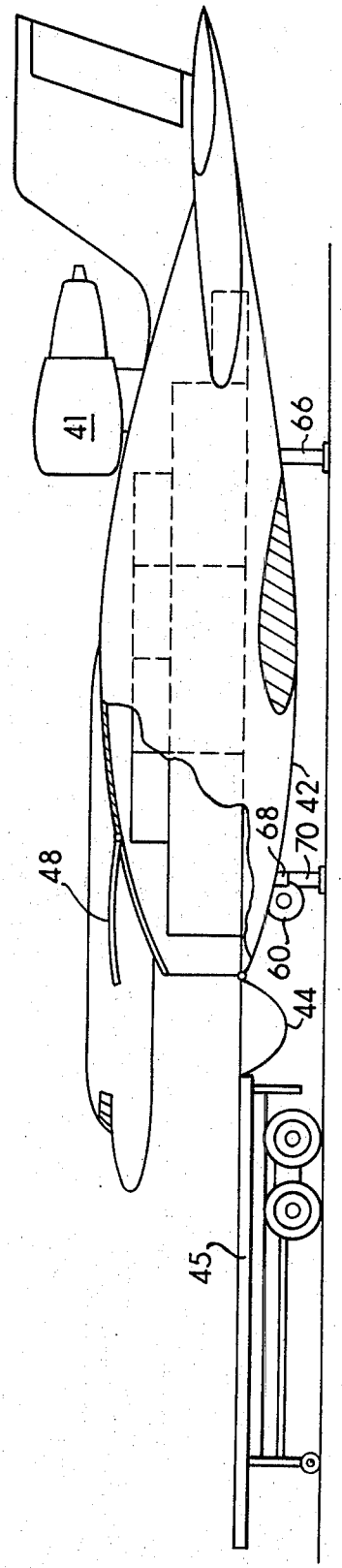
FIG. 5 is a side view of the aircraft on the ground.

As shown in FIG. 5, when the cargo aircraft is on the ground, it is closely aligned horizontally with conventional loading ramps because the landing gear does not have to support the aircraft high off the ground during take-off. In accordance with another aspect of our invention, we further enable the aircraft to align exactly with a truck bed 45 or ramp and to remain stable during these operations. A plurality of hydraulically operated mechanically rigid positioning units provide these advantages. Our aircraft is shown with a tricycle landing gear arrangement. That is, there is a centrally disposed forward landing gear 60 and two rear landing gears, only the port landing gear 62 being shown in FIG. 3, the second or, starboard landing gear 64 being shown in FIG. 2. By way of example, we install a "positioning" unit 66 midway between and in line with the rear landing gears 62 and 64. Two outboard positioning units 68 and 70 are on a transverse line through the forward landing gear 60. When the aircraft 10 is on the ground and properly located with respect to the loading ramp, the positioning units lower until they support the entire weight of the aircraft. After the landing gears retract, the positioning units can be controlled independently to align the cargo floor 35 with the loading ramp or other surface supporting the cargo. As the positioning units are mechanically rigid, changes in cargo weight do not shift in the cargo floor level as occurs in prior aircraft.

This arrangement has still another advantage. In many airports, adequate tools for changing tires are not available. If a conventional aircraft has a flat tire, the aircraft is grounded until the necessary tools can be flown to the airport and the tire changed. In this case, a positioning unit can be lowered and the appropriate landing gear partially retracted. This enables the tire change without any lifting jacks.

There are several specific embodiments the positioning units can take. For example, each unit could comprise a jackscrew affixed to a lower portion of the frame which supports the lower hull covering 42. These jackscrews are well known. They may be electrically or hydraulically operated to facilitate their operation or even manually operated.

Thus, cargo aircraft constructed in accordance with various aspects of our invention have several advantages over prior general-purpose and special-purpose aircraft. They carry cargo very efficiently. Changes in cargo-carrying capacities for different applications are made simply and with a minimum expense. Substantially the entire hull can be devoted to unobstructed storage area. This eliminates special packing procedures required in prior aircraft. Furthermore, the distributed nature of the load across the aircraft greatly eases payload restrictions which the zero fuel weight limit imposes in prior aircraft.

As will be apparent, this aircraft can be modified extensively by persons of ordinary skill in the art. For example, I describe the hull 18 primarily in terms of a number of hull modules. As noted, however, the hull 18 may be an integral unit. I describe specific placements for wings, control surfaces and motors. Those locations could change from aircraft to aircraft. Hence, I believe these and other modifications are clearly within the true spirit and scope of the invention and it is the object of the appended claims to cover all such modifications.

What I claim as new and desire to secure by Letters Patent of the United States is:

1. An aircraft comprising:
   A. a hull having a roll axis and including a plurality of juxtaposed hull modules, each module including:
      i. a planar cargo support means extending substantially throughout the length and width of the hull module,
      ii. an external covering surrounding said cargo support means, said covering means constituting an airfoil in the vertical cross sections parallel to the roll axis and being substantially rectangular in cross sections normal to the roll axis to thereby provide a substantially structurally unobstructed cargo space above said support means throughout said hull module, said hull module generating a lift in flight which substantially offsets the combined weight of said hull module and the cargo it carries,
B. wings connected to said hull,
C. means for controlling the aircraft in flight connected to said hull and wings,
D. means for powering the aircraft, and
E. a fuselage connected to an upper portion of said hull to be completely above said cargo space in one of said hull modules.

2. An aircraft as recited in claim 1 wherein said fuselage means is pressurized and said hull modules are unpressurized.

3. An aircraft as recited in claim 1 wherein each hull module includes access means for opening the cargo space therein for loading and unloading cargo.

4. An aircraft as recited in claim 3 additionally comprising fuselage means mounted to one of said hull modules to an upper portion thereof, said access means for the hull module extending beneath said fuselage means.

5. An aircraft as recited in claim 3 wherein said access means comprises at least one door on a leading edge of said hull module.

6. An aircraft comprising:
A. a hull having a roll axis and including:
i. planar cargo support means running substantially throughout the length and width of said hull,
ii. an external covering means surrounding said cargo support means, said external covering means constituting an airfoil in the vertical cross sections parallel to the roll axis and being substantially rectangular in the corss sections normal to the roll axis along substantially all of the roll axis to thereby provide a substantially unobstructed cargo space above said support means throughout the length of said hull, said hull generating a lift in flight which substantially offsets the combined weight of said hull and the cargo it carries, and
iii. access means including door means traversing a leading edge of said hull, said door means in an open position exposing substantially the entire width of said cargo space across said hull and in a closed position constituting an integral portion of the leading edge of the airfoil formed by said external covering means,
B. wings connected to said hull,
C. means for controlling the aircraft in flight connected to said hull and wings,
D. means for powering the aircraft, and
E. a fuselage means mounted to a hull portion to be completely above said cargo support space.

* * * * *